United States Patent
Schwindaman et al.

(10) Patent No.: US 10,471,878 B2
(45) Date of Patent: Nov. 12, 2019

(54) RETRACTABLE ROOM ACTUATION ASSEMBLY FOR RECREATIONAL VEHICLE

(71) Applicant: LIPPERT COMPONENTS MANUFACTURING, INC., Elkhart, IN (US)

(72) Inventors: Michael A. Schwindaman, Cassopolis, MI (US); Thomas J. Rogers, Cassopolis, MI (US); Michael W. Howard, Elkhart, IN (US)

(73) Assignee: LIPPERT COMPONENTS MANUFACTURING, INC., Elkhart, IN (US)

( * ) Notice: Subject to any disclaimer, the term of this patent is extended or adjusted under 35 U.S.C. 154(b) by 0 days.

(21) Appl. No.: 16/152,843

(22) Filed: Oct. 5, 2018

(65) Prior Publication Data

US 2019/0031077 A1  Jan. 31, 2019

Related U.S. Application Data

(60) Continuation of application No. 15/618,601, filed on Jun. 9, 2017, now Pat. No. 10,093,219, which is a
(Continued)

(51) Int. Cl.
*H02P 1/54* (2006.01)
*B60P 3/34* (2006.01)

(52) U.S. Cl.
CPC ........... *B60P 3/34* (2013.01); *Y10T 29/49622* (2015.01)

(58) Field of Classification Search
CPC .............................. B60P 3/34; Y10T 29/49622
See application file for complete search history.

(56) References Cited

U.S. PATENT DOCUMENTS

| 1,279,819 A | 9/1918 | Zingsheim et al. |
| 1,521,635 A | 1/1925 | Lewis |
(Continued)

FOREIGN PATENT DOCUMENTS

| AU | 8532575 A | 4/1977 |
| CA | 2136673 | 3/1996 |
(Continued)

OTHER PUBLICATIONS

"Drew Industries Acquires Rights to New RV Components Including Innovative Wall Slide," PR Newswire, http://www.prnewswire.com/news-releases/drew-industries-acquires-rights-to-new-rv-components-including-innovative-wall-slide-87853762.html, pp. 1-3, obtained from internet on Apr. 4, 2014.
(Continued)

*Primary Examiner* — Karen Masih
(74) *Attorney, Agent, or Firm* — Nixon & Vanderhye P.C.

(57) ABSTRACT

A slide-out or retractable room for a mobile living quarters, such as a recreational vehicle, is provided with actuating assemblies mounted on opposite side walls of the slide-out room and the adjacent wall of the main living area. The actuating assemblies include a pair of parallel gear racks mounted on the side wall, which are engaged by pinions rotated by torque shafts mounted on the main living quarters. Each torque shaft is rotated by a separate motor. A roller engages a bearing surface on the lower portion of the gear racks. Accordingly, the slide-out room is extended and retracted by rotating the torque shafts to cause the gear racks and the attached slide-out room to extend and retract. The weight of the slide-out room is supported by the rollers, thereby supporting the slide-out room off of the floor of the main living quarters as it extends and retracts. A synchronizing control operates the motors.

21 Claims, 9 Drawing Sheets

Related U.S. Application Data continuation of application No. 14/942,446, filed on Nov. 16, 2015, now Pat. No. 9,694,733, which is a continuation of application No. 14/041,033, filed on Sep. 30, 2013, now Pat. No. 9,193,291, which is a continuation of application No. 13/495,500, filed on Jun. 13, 2012, now Pat. No. 8,581,540, which is a division of application No. 13/180,687, filed on Jul. 12, 2011, now Pat. No. 8,317,250, which is a division of application No. 12/683,332, filed on Jan. 6, 2010, now Pat. No. 8,016,343.

(60) Provisional application No. 61/205,551, filed on Jan. 21, 2009.

(56) References Cited

U.S. PATENT DOCUMENTS

| | | |
|---|---|---|
| 2,136,130 A | 11/1938 | Gorlenko |
| 2,561,921 A | 7/1951 | Guillot |
| 2,704,233 A | 3/1955 | Schjolin |
| 2,744,781 A | 5/1956 | Black |
| 2,813,747 A | 11/1957 | Rice, Jr. |
| 2,877,509 A | 3/1959 | Klibanow |
| 2,965,412 A | 12/1960 | Henderson |
| 2,987,342 A | 6/1961 | Meaker et al. |
| 2,995,398 A | 8/1961 | Davenport |
| 3,106,750 A | 10/1963 | Jarman |
| 3,137,041 A | 6/1964 | Mullen |
| 3,169,280 A | 2/1965 | Jarman |
| 3,181,910 A | 5/1965 | Thomas |
| 3,288,518 A | 11/1966 | Oliver |
| 3,469,356 A | 9/1969 | White |
| 3,740,088 A | 6/1973 | Ratcliff |
| 3,884,520 A | 5/1975 | Peterson |
| 3,888,539 A | 6/1975 | Niessner |
| 3,967,170 A | 6/1976 | MacDonald et al. |
| 4,049,310 A | 9/1977 | Yoder |
| 4,080,699 A | 3/1978 | Anderson |
| 4,128,269 A | 12/1978 | Stewart |
| 4,133,571 A | 1/1979 | Fillios |
| 4,253,283 A | 3/1981 | May |
| 4,351,135 A | 9/1982 | Freller |
| 4,500,132 A | 2/1985 | Yoder |
| 4,657,300 A | 4/1987 | Penny et al. |
| 4,711,257 A | 12/1987 | Kobayashi |
| 4,900,217 A | 2/1990 | Nelson |
| 4,930,837 A | 6/1990 | Marsh et al. |
| 5,050,927 A | 9/1991 | Montanari |
| 5,061,006 A | 10/1991 | Baughman |
| 5,102,179 A | 4/1992 | Royer |
| 5,154,469 A | 10/1992 | Morrow |
| 5,237,782 A | 8/1993 | Cooper |
| 5,248,180 A | 9/1993 | Hussaini |
| 5,295,430 A | 3/1994 | Dewald et al. |
| 5,332,276 A | 7/1994 | Blodgett, Jr. |
| 5,333,420 A | 8/1994 | Eden |
| 5,491,933 A | 2/1996 | Miller et al. |
| 5,560,444 A | 10/1996 | Tiedge |
| 5,560,667 A | 10/1996 | Edry |
| 5,577,351 A | 11/1996 | Dewald, Jr. et al. |
| 5,586,802 A | 12/1996 | Dewald, Jr. et al. |
| 5,634,683 A | 6/1997 | Young |
| 5,706,612 A | 1/1998 | Tillett |
| 5,758,918 A | 6/1998 | Schneider et al. |
| 5,791,715 A | 8/1998 | Nebel |
| 5,800,002 A | 9/1998 | Tiedge |
| 5,829,822 A | 11/1998 | Tiedge |
| 5,833,296 A | 11/1998 | Schneider |
| 5,857,733 A | 1/1999 | Dewald, Jr. et al. |
| 5,860,686 A | 1/1999 | Tiedge |
| 5,894,698 A | 4/1999 | Dewald et al. |
| 5,902,001 A | 5/1999 | Schneider |
| 5,909,935 A | 6/1999 | Esperandieu et al. |
| 5,915,774 A | 6/1999 | Tiedge |
| 5,971,471 A | 10/1999 | Gardner |
| 5,984,396 A | 11/1999 | Schneider |
| 6,003,919 A | 12/1999 | Shook |
| 6,108,983 A | 8/2000 | Dewald, Jr. et al. |
| 6,109,683 A | 8/2000 | Schneider |
| 6,116,671 A | 9/2000 | Schneider |
| 6,152,520 A | 11/2000 | Gardner |
| 6,176,045 B1 | 1/2001 | McManus et al. |
| 6,182,401 B1 | 2/2001 | McManus et al. |
| 6,202,362 B1 | 3/2001 | McManus et al. |
| 6,227,607 B1 | 5/2001 | Dewald et al. |
| 6,234,566 B1 | 5/2001 | Cyr |
| 6,254,171 B1 | 7/2001 | Young, Sr. |
| 6,286,883 B1 | 9/2001 | Schneider et al. |
| 6,293,611 B1 | 9/2001 | Schneider et al. |
| 6,325,437 B2 | 12/2001 | Hiebert et al. |
| 6,338,523 B1 | 1/2002 | Rasmussen |
| 6,345,854 B1 | 2/2002 | McManus |
| 6,354,646 B1 | 3/2002 | McManus et al. |
| 6,402,216 B1 | 6/2002 | McManus et al. |
| 6,415,675 B1 | 7/2002 | Schneider et al. |
| 6,422,628 B1 | 7/2002 | Bortelli |
| 6,454,336 B1 | 9/2002 | Nye et al. |
| 6,471,275 B1 | 10/2002 | Kunz |
| 6,494,518 B2 | 12/2002 | Kreil et al. |
| 6,497,449 B2 | 12/2002 | Graf et al. |
| 6,527,324 B2 | 3/2003 | McManus et al. |
| 6,536,821 B1 | 3/2003 | Gardner |
| 6,536,823 B2 | 3/2003 | McManus |
| 6,568,734 B2 | 5/2003 | Buls |
| 6,572,170 B2 | 6/2003 | McManus et al. |
| 6,575,514 B2 | 6/2003 | McManus et al. |
| 6,598,354 B2 | 7/2003 | McManus et al. |
| 6,601,896 B1 | 8/2003 | Nye et al. |
| 6,619,713 B2 | 9/2003 | Eichhorn |
| 6,619,714 B2 | 9/2003 | Schneider et al. |
| 6,623,066 B2 | 9/2003 | Garceau et al. |
| 6,637,794 B2 | 10/2003 | McManus et al. |
| 6,679,541 B1 | 1/2004 | Hanser et al. |
| 6,681,531 B2 | 1/2004 | McManus |
| 6,685,249 B2 | 2/2004 | Schneider |
| 6,696,813 B2 | 2/2004 | McManus |
| 6,702,353 B1 | 3/2004 | Blodgett, Jr. |
| 6,729,669 B2 | 5/2004 | McManus et al. |
| 6,729,670 B1 | 5/2004 | Buls |
| 6,783,164 B2 | 8/2004 | Bortell et al. |
| 6,796,590 B2 | 9/2004 | Schneider |
| 6,802,555 B2 | 10/2004 | Yoder et al. |
| 6,805,391 B2 | 10/2004 | Schneider |
| 6,871,897 B1 | 3/2005 | Snyder |
| 6,896,307 B2 | 5/2005 | Nye et al. |
| 6,905,154 B1 | 6/2005 | Buls |
| 6,932,403 B2 | 8/2005 | Meijer et al. |
| 6,948,754 B2 | 9/2005 | Huffman et al. |
| 6,976,721 B2 | 12/2005 | Rasmussen |
| 6,981,728 B2 | 1/2006 | Rasmussen et al. |
| 7,004,528 B2 | 2/2006 | Nye et al. |
| 7,040,689 B2 | 5/2006 | Few et al. |
| 7,052,064 B2 | 5/2006 | Rasmussen |
| 7,052,065 B2 | 5/2006 | Rasmussen |
| 7,073,844 B2 | 7/2006 | Garceau et al. |
| 7,150,483 B2 | 12/2006 | Rasmussen |
| 7,175,219 B1 | 2/2007 | Blodgett, Jr. |
| 7,204,536 B2 | 4/2007 | Kunz |
| 7,210,269 B2 | 5/2007 | Garceau et al. |
| 7,229,123 B2 | 6/2007 | Kunz |
| 7,234,747 B2 | 6/2007 | Rasmussen |
| 7,258,382 B2 | 8/2007 | Kunz et al. |
| 7,258,389 B2 | 8/2007 | Franzini |
| 7,322,628 B2 | 1/2008 | Kunz |
| 7,354,088 B2 | 4/2008 | Garceau et al. |
| 7,360,815 B2 | 4/2008 | Kunz et al. |
| 7,360,821 B2 | 4/2008 | Kunz |
| 7,370,900 B1 | 5/2008 | Blodgett, Jr. |
| 7,374,218 B2 | 5/2008 | Schneider |
| 7,407,211 B2 | 8/2008 | Kunz |
| 7,427,092 B2 | 9/2008 | Wolf et al. |
| 7,461,480 B1 | 12/2008 | Gardner |
| 7,540,549 B2 | 6/2009 | Revelino et al. |

(56) References Cited

U.S. PATENT DOCUMENTS

| | | | |
|---|---|---|---|
| 7,607,365 | B1 | 10/2009 | Courser |
| 7,614,675 | B2 | 11/2009 | Kunz |
| 7,802,834 | B2 | 9/2010 | Cadena et al. |
| 7,871,114 | B2 | 1/2011 | Schultz et al. |
| 8,042,853 | B2 | 10/2011 | Garceau |
| 8,141,927 | B2 | 3/2012 | Kreil |
| 8,235,455 | B2 | 8/2012 | Schwindaman et al. |
| 8,240,744 | B2 | 8/2012 | Schwindaman et al. |
| 8,573,666 | B2 | 11/2013 | Schwindaman et al. |
| 2002/0060467 | A1 | 5/2002 | McManus et al. |
| 2002/0084664 | A1 | 7/2002 | McManus et al. |
| 2002/0180232 | A1 | 12/2002 | Schneider et al. |
| 2003/0155791 | A1 | 8/2003 | Gurdjian et al. |
| 2004/0094983 | A1 | 5/2004 | Bortell |
| 2005/0062305 | A1 | 3/2005 | Blaudow |
| 2005/0230989 | A1 | 10/2005 | Nebel |
| 2006/0113822 | A1 | 6/2006 | Kunz |
| 2006/0162067 | A1 | 7/2006 | Roepke |
| 2008/0265618 | A1 | 10/2008 | Cadena et al. |
| 2009/0057466 | A1 | 3/2009 | Choi et al. |
| 2009/0192691 | A1 | 7/2009 | O'Connor et al. |
| 2009/0261610 | A1 | 10/2009 | Kreil |
| 2009/0309382 | A1 | 12/2009 | Moore et al. |
| 2010/0066025 | A1 | 3/2010 | Kreil |
| 2011/0144805 | A1 | 6/2011 | Chiappetta et al. |
| 2011/0156430 | A1 | 6/2011 | Gardner |
| 2013/0037068 | A1 | 2/2013 | Cutler |
| 2014/0197655 | A1 | 7/2014 | Stichter |
| 2015/0008695 | A1 | 1/2015 | Yoder |
| 2018/0347677 | A1* | 12/2018 | Carlson ............... F16H 19/04 |

FOREIGN PATENT DOCUMENTS

| | | |
|---|---|---|
| DE | 1095137 A | 12/1960 |
| EP | 0065398 | 11/1982 |
| EP | 1157885 | 11/2001 |
| EP | 1283405 A2 | 2/2003 |
| EP | 1647446 | 4/2006 |
| JP | 10059058 | 12/1998 |
| WO | WO 1998/056613 | 12/1998 |
| WO | WO 2000/038948 | 7/2000 |
| WO | WO 2000/069095 | 11/2000 |
| WO | WO 2002/020309 | 3/2002 |
| WO | WO 2010/015062 | 2/2010 |

OTHER PUBLICATIONS

*AL-KO Kober, LLC* v. *Lippert Components Manufacturing, Inc.*, " Decision—Denying Institution of Inter Partes Review 37 C.F.R. § 42.108," Paper No. 7, Case IPR2014-00213, U.S. Pat. No. 8,235,455 (Jun. 6, 2014).
*AL-KO Kober, LLC* v. *Lippert Components Manufacturing, Inc.*, "Corrected Petition for Inter Partes Review of U.S. Pat. No. 8,573,666 under 35 U.S.C. §§ 311-319 and 37 C.F.R. § 42.100 ET SEQ.," Paper No. 6, Case IPR2014-00313, U.S. Pat. No. 8,573,666, incl. Declaration of Dr. Frank J. Fronczak (Jan. 23, 2014).
*AL-KO Kober, LLC* v. *Lippert Components Manufacturing, Inc.*, Decision—Institution of Inter Partes Review 37 C.F.R. § 42.108, Paper No. 9, Case IPR2014-00313 U.S. Pat. No. 8,573,666 (Jun. 6, 2014).
*AL-KO Kober, LLC* v. *Lippert Components Manufacturing, Inc.*, Decision—Denying Institution of Inter Partes Review 37 C.F.R. § 42.108, Paper No. 7, Case IPR2014-00211, U.S. Pat. No. 8,240,744 (Jun. 6, 2014).
*AL-KO Kober, LLC* v. *Lippert Components Manufacturing, Inc.*, "Deposition of Frank J. Fronczak," Inter Partes Review of U.S. Pat. No. 8,573,666, (Aug. 21, 2014).
*AL-KO Kober, LLC* v. *Lippert Components Manufacturing, Inc.*, "Deposition of Massoud S. Tavakoli," Case IPR2014-00313, U.S. Pat. No. 8,573,666 (Dec. 10, 2014).
*AL-KO Kober, LLC* v. *Lippert Components Manufacturing, Inc.*, "Patent Owner's Response," Paper No. 15, Case IPR2014-00313, U.S. Pat. No. 8,573,666 (Sep. 8, 2014).
*AL-KO Kober, LLC* v. *Lippert Components Manufacturing, Inc.*, "Petition for Inter Partes Review of U.S. Pat. No. 8,573,666 under 35 U.S.C. §§ 311-319 and 37 C.F.R. § 42.100 ET SEQ.," Case IPR2014-00313, U.S. Pat. No. 8,573,666, incl. Declaration of Dr. Frank J. Fronczak (Dec. 31, 2013).
*AL-KO Kober, LLC* v. *Lippert Components Manufacturing, Inc.*, "Petitioner's Reply to Patent Owners' Response to Petition," Paper No. 21, Case IPR2014-00313, U.S. Pat. No. 8,573,666 (Dec. 19, 2014).
*AL-KO Kober, LLC* v. *Lippert Components Manufacturing, Inc.*, "Second Corrected Petition for Inter Partes Review of U.S. Pat. No. 8,573,666 under 35 U.S.C. §§ 311-319 and 37 C.F.R. § 42.100 ET SEQ.," Paper No. 8, Case IPR2014-00313, U.S. Pat. No. 8,573,666, incl. Declaration of Dr. Frank J. Fronczak (Feb. 10, 2014).
*AL-KO Kober, LLC* v. *Lippert Components Manufacturing, Inc.*, Declaration of Dr. Massoud S. Tavakoli, Case IPR2014-00313, U.S. Pat. No. 8,573,666 (Sep. 8, 2014).
*AL-KO Kober, LLC* v. *Schwindaman et al.*, "Corrected Petition for Inter Partes Review of U.S. Pat. No. 8,235,455 under 35 U.S.C. §§ 311-319 and 37 C.F.R. § 42.100 ET SEQ.," Paper No. 5, Case IPR2014-00213, U.S. Pat. No. 8,235,455, incl. Declaration of Dr. Frank J. Fronczak (Dec. 20, 2013).
*AL-KO Kober, LLC* v. *Schwindaman et al.*, "Corrected Petition for Inter Partes Review of U.S. Pat. No. 8,240,744 under 35 U.S.C. §§ 311-319 and 37 C.F.R. § 42.100 ET SEQ.," Paper No. 5, Case IPR2014-00211, U.S. Pat. No. 8,240,744, incl. Declaration of Dr. Frank J. Fronczak (Dec. 20, 2013).
*AL-KO Kober, LLC* v. *Schwindaman et al.*, "Petition for Inter Partes Review of U.S. Pat. No. 8,235,455 under 35 U.S.C. §§ 311-319 and 37 C.F.R. § 42.100 ET SEQ.," Case IPR2014-00213, U.S. Pat. No. 8,235,455, incl. Declaration of Dr. Frank J. Fronczak (Dec. 2, 2013).
*AL-KO Kober, LLC* v. *Schwindaman et al.*, Petition for Inter Partes Review of U.S. Pat. No. 8,240,744 under 35 U.S.C. §§ 311-319 and 37 C.F.R. § 42.100 ET SEQ., Case IPR2014-00211, U.S. Pat. No. 8,240,744, incl. Declaration of Dr. Frank J. Fronczak (Dec. 2, 2013).
Australian Patent Examination Report No. 1, issued in Australian Patent Application No. 2010246535, dated Mar. 27, 2014.
Defendant AL-KO Kober, LLC's Preliminary Invalidity Contentions filed in *Lippert Components Manufacturing, Inc.* v. *AL-KO Kober, LLC*, Case No. 3:13-cv-00697-JVB-CAN, dated Apr. 7, 2014.
European Examination Report issued in European Patent Application No. 10189732.0, dated Jul. 28, 2014.
European Search Report issued in European Patent Application No. 10189732.0, dated Apr. 11, 2011.
Inter Partes Review Case No. 2014-00211 of U.S. Pat. No. 8,240,744, Filing Date Dec. 12, 2013.
Inter Partes Review Case No. 2014-00213 of U.S. Pat. No. 8,235,455, Filing Date Dec. 1 2, 2013.
Inter Partes Review Case No. 2014-00313 of U.S. Pat. No. 8,573,666, Filing Date Dec. 31, 2013.
*Lippert Components Manufacturing, Inc.* v. *AL-KO Kober, LLC*, Defendant AL-KO Kober, LLC's Preliminary Invalidity Contentions, Civil Action No. 3:13-cv-00697-JVB-CAN, incl. Exhibits A~E (Apr. 7, 2014).
WIT Club News, "Service Tips, Slideout Rooms", pp. 1-5 (2001).

\* cited by examiner

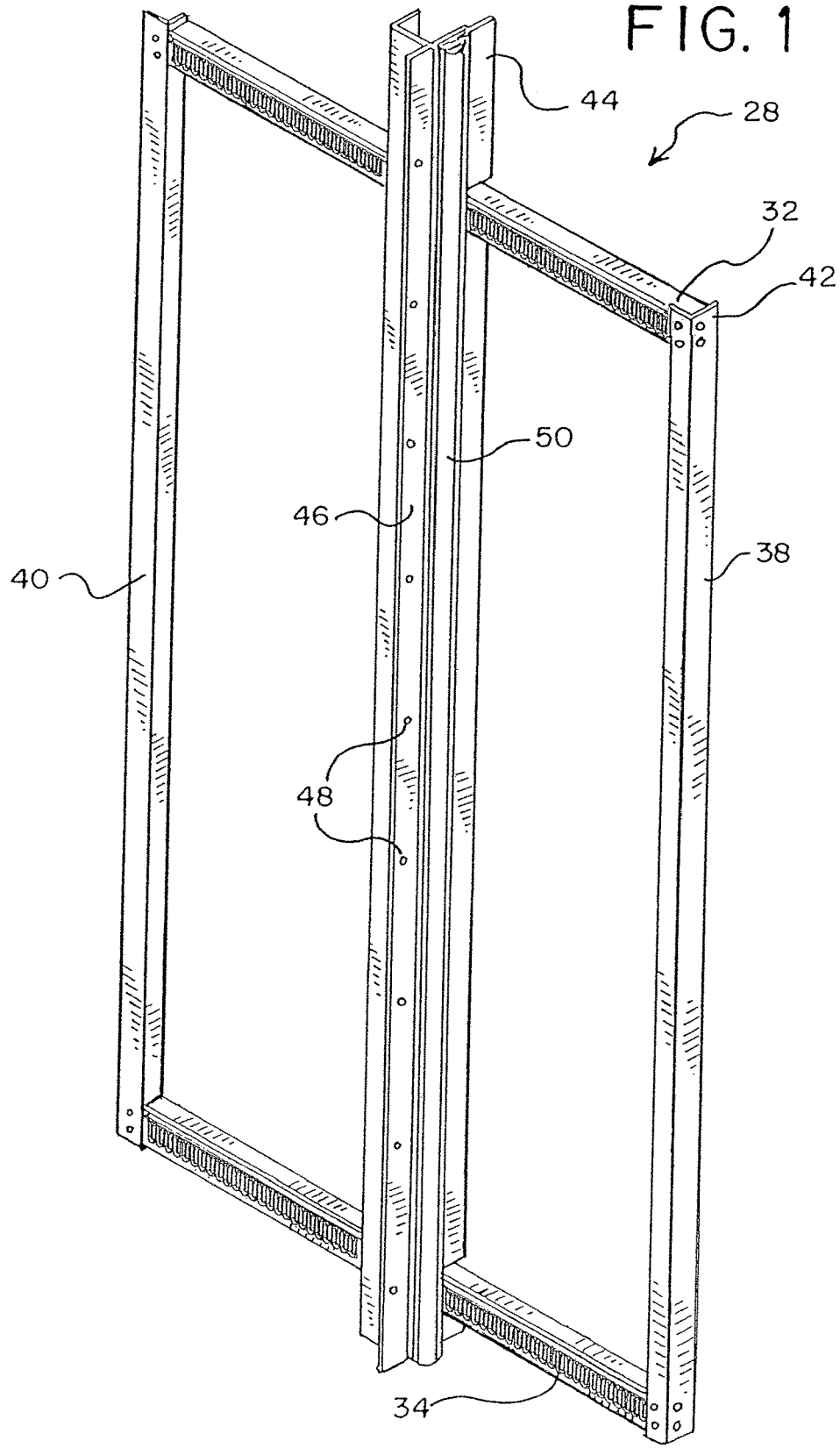

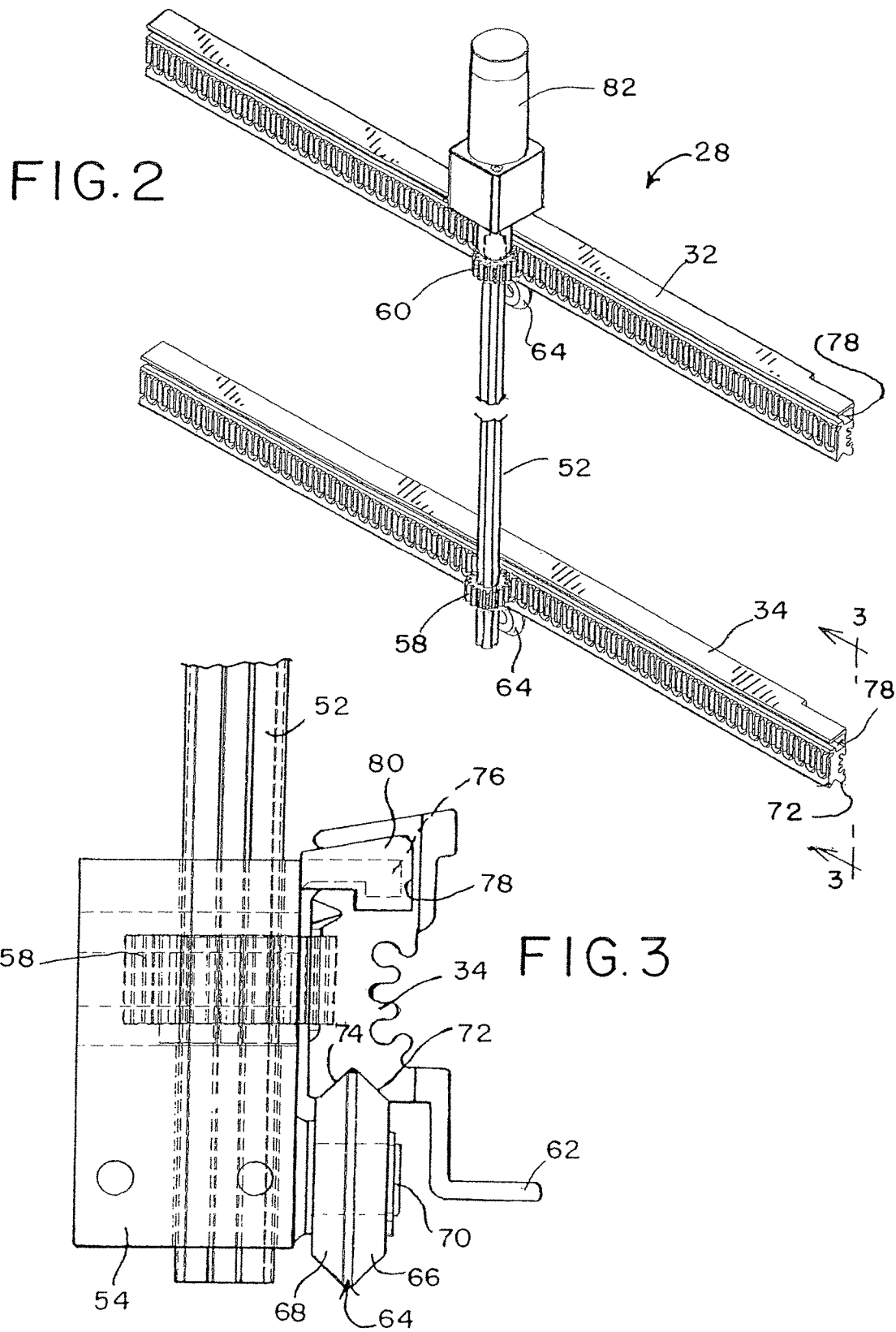

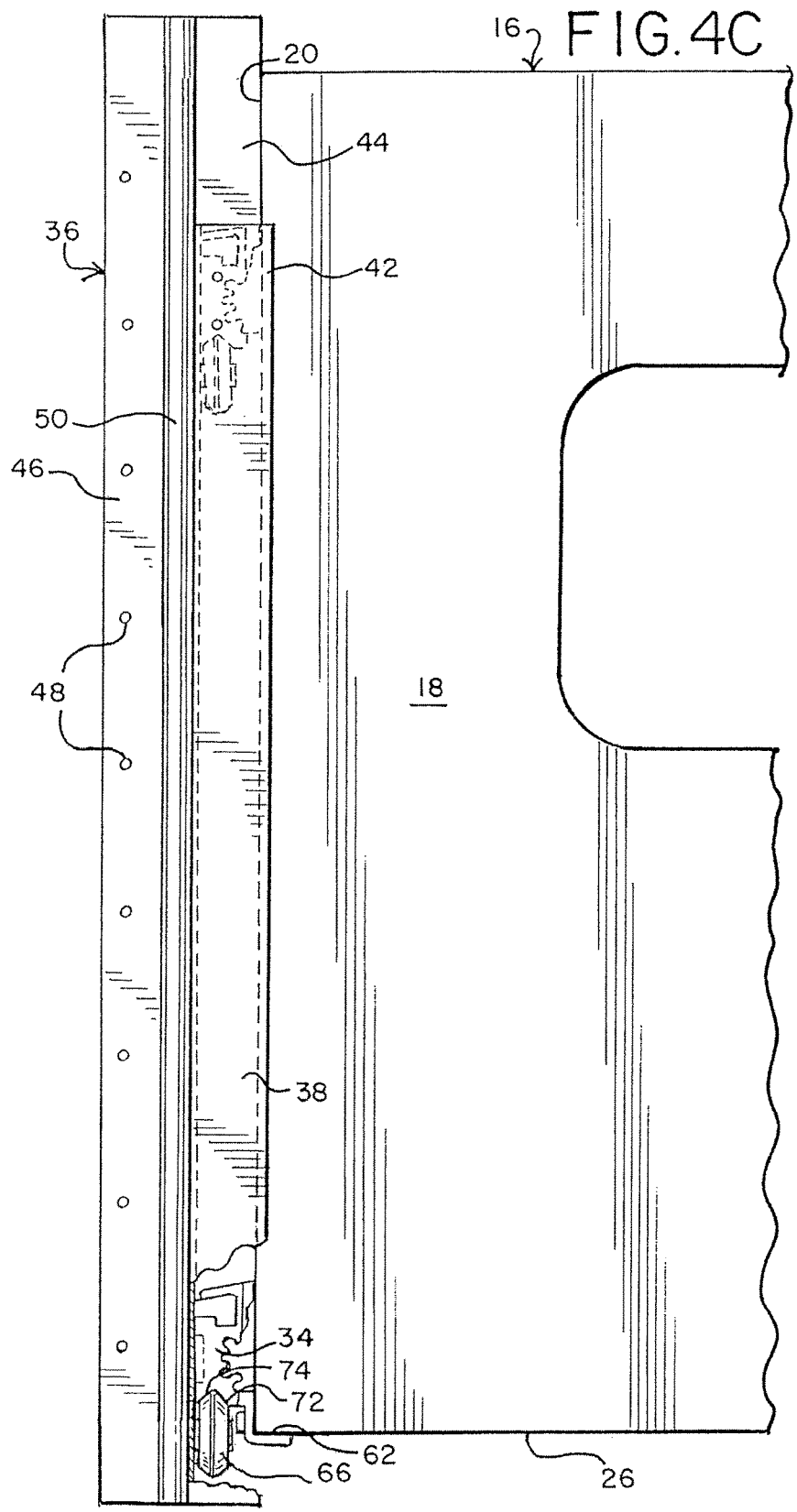

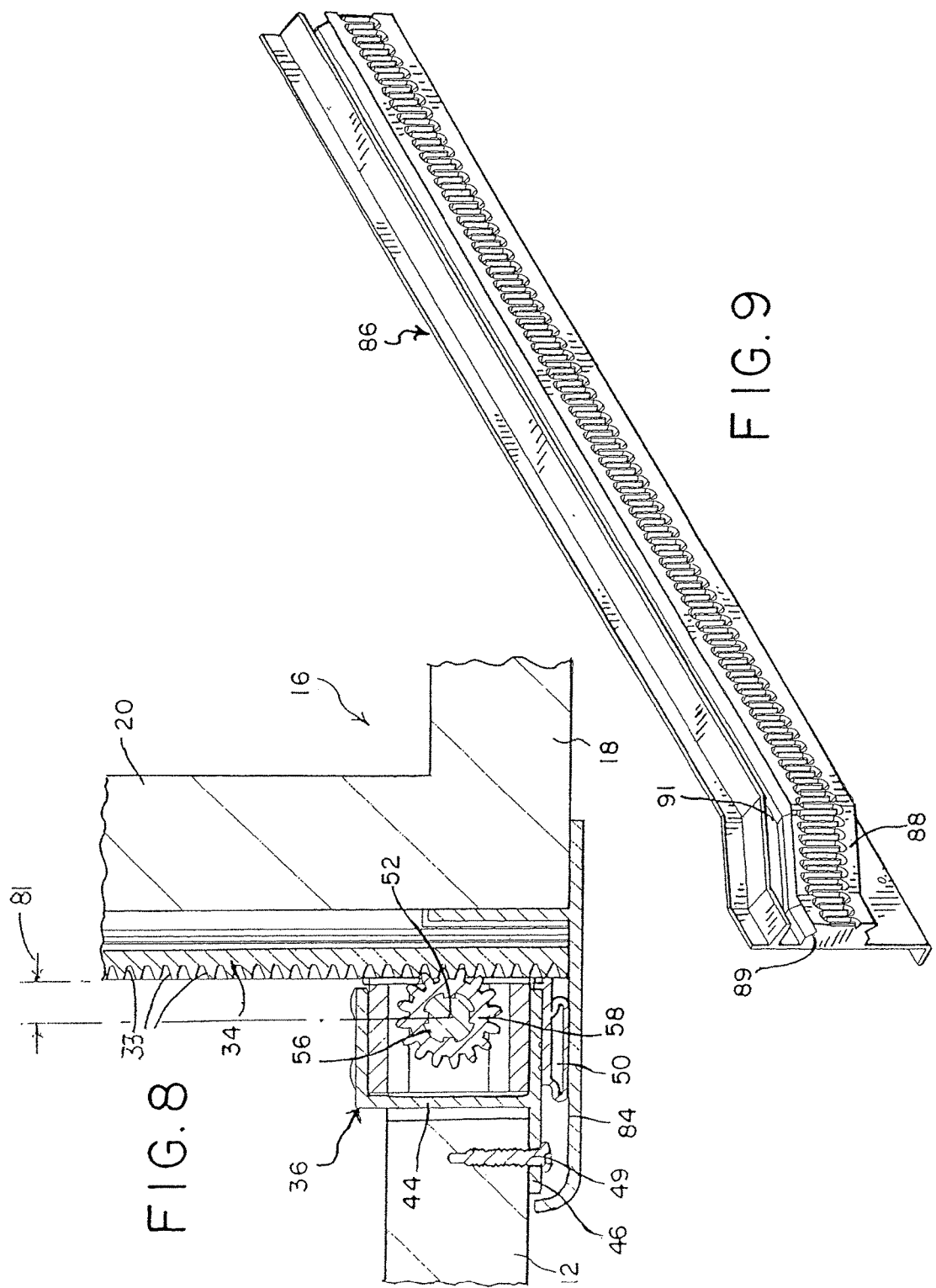

US 10,471,878 B2

RETRACTABLE ROOM ACTUATION ASSEMBLY FOR RECREATIONAL VEHICLE

CROSS REFERENCE TO RELATED APPLICATIONS

This application is a continuation of U.S. patent application Ser. No. 15/618,601, filed Jun. 9, 2017, which is a continuation of U.S. patent application Ser. No. 14/942,446, filed Nov. 16, 2015, which is a continuation of U.S. patent application Ser. No. 14/041,033, filed Sep. 30, 2013, now U.S. Pat. No. 9,193,291, which is a continuation of U.S. patent application Ser. No. 13/495,500, filed Jun. 13, 2012, now U.S. Pat. No. 8,581,540, issued on Nov. 12, 2013, which is a division of U.S. patent application Ser. No. 13/180,687, filed Jul. 12, 2011, now U.S. Pat. No. 8,317,250, issued on Nov. 27, 2012, which is a division of U.S. patent application Ser. No. 12/683,332, filed Jan. 6, 2010, now U.S. Pat. No. 8,016,343, issued on Sep. 13, 2011, which claims domestic priority based upon U.S. Provisional Patent Application No. 61/205,551, filed Jan. 21, 2009, the disclosures of which are hereby incorporated by reference in their entireties.

BACKGROUND OF THE INVENTION

This invention relates to a slide-out or retractable room for mobile living quarters, such as a recreation vehicle.

Recreational vehicles, such as motor homes, fifth-wheel trailers, and travel trailers may be provided with a retractable or slide-out room for increasing the living space of the vehicle. The retractable or slide-out room is extended for use when the vehicle is parked and is retracted into the main living area of the vehicle when the vehicle is to be moved. Existing retractable or slide-out rooms can be time-consuming and difficult to install. Frequently, the operating mechanisms consist of many separate components that must be individually installed, connected and adjusted by highly-trained employees when the unit is assembled. After the vehicle is put into service, adjustments by the vehicle owner are often necessary. Furthermore, existing slide-out rooms require substantial space for mounting large electrical motors and hydraulic units that require the construction of expensive covers and thus reduce the overall space inside the vehicle. Such slide-out or retractable rooms are generally moved in and out of the vehicle across the floor of the main living area. Because the slide-out or retractable room is exposed to weather when extended, extension and retraction of the slide-out room causes staining and wear on the interior floor of the vehicle.

Generally, the physical size of the operating mechanism or slide-out room is large and bulky and somehow has to be hidden. Concealing the operating mechanism requires space either inside the vehicle, which lessens the living space, or under the vehicle, which lessen room for the mechanical systems such as storage tanks and axles. The object of any slide-out room is to add space, so a need exists for a slide mechanism that requires no interior or exterior space.

Generally, existing mechanisms for extending and retracting slide-out rooms employ powerful hydraulic or eletro-mechanical systems that have a fixed amount of working stroke. When actuated, these powerful devices will push or pull the slide room until they run out of useable stroke. When obstructions, such as trees on the exterior or furniture and suitcases on the interior, are encountered before the wholly extended or wholly retracted position is attained, the actuation mechanism has more then enough power to overcome the obstruction and keep going. This can destroy the slide-out room, which is generally made from light weight wood or aluminum tube. Sadly, sometimes human beings are encountered, often resulting in injury or death. Therefore, it is desirable that obstructions be sensed and the actuation mechanism stopped, Tolerances needed to construct slide-out rooms are large. Therefore, the side walls of the same slide-out room rarely have the same dimensions. When one side wall is deeper than the other side wall, only the shorter side wall can be adjusted to properly seal against the weather. An example is a slideroom that has one side wall built incrementally longer than the other side wall. With a fixed stroke equal to the length of the shorter side wall, the longer side is unable to attain full stroke and properly seal. This permits moisture to enter the unit and cause extensive damage. Therefore, a need exists for a slide room mechanism that can independently sense and automatically adjust stroke to a sealed position on each side of the slide room.

All known prior art for slide room mechanisms attach the actuating mechanism to the unit. Sometimes the mechanism is mounted to the floor of the unit, or to the side wall, chassis or frame of the unit. After the actuating mechanism is mounted on the unit, the slide-out room is attached. Due to natural manufacturing tolerances, the opening to accept the slide-out room typically varies from unit to unit in both height and width, while the slide-out room itself also varies in height and width. However, the seal used to keep weather out of the unit is manufactured to a set dimension. Numerous adjustments up and down and left and right are required to center the slide-out room to the opening in the unit in order to provide a weather-tight seal when the room is extended and retracted. As the unit is used, normal road vibrations tend to cause the slide-out room to come out of adjustment, allowing moisture to enter the interior of the vehicle causing extensive damage. Therefore, a need exists for a slide room mechanism that requires no mechanical adjustment, both at installation and as it is used.

SUMMARY OF THE INVENTION

According to the present invention, actuating mechanisms are installed on opposite side walls of the slide-out room and the adjoining portions of the wall of the main living area through which the slide-out room extends and retracts. Each of the actuating assemblies include a pair of pinion gears mounted on a rotatable torque shaft, which are supported for rotation on the main living quarters adjacent to the aperture in the wall of the main living quarters through which the slide-out room extends and retracts. The two pinion gears rotate with a common shaft, and are meshed with the teeth of corresponding gear racks which are mounted on the adjacent side wall of the slide-out room. Rollers engage corresponding bearing surfaces defined on the racks to support the slide-out room as it extends and retracts and also to assure that the pinions remain meshed with the racks. In an optional embodiment of the invention, racks are provided with an inclined section, which permits the room to drop as it approaches the extended position to bring the floor of the slide-out room flush with the floor of the main living quarters, thereby eliminating the unsightly and inconvenient step-up between the slide-out room and the main living quarters.

BRIEF DESCRIPTION OF THE DRAWINGS

FIG. 1 is a view in perspective of the left hand actuating assembly of the slide-out room as it is shipped from the factory for installation on the slide-out room; the right hand assembly being a mirror image thereof;

FIG. 2 is a view in perspective of a portion of the actuating mechanism illustrated in FIG. 1, with the bearing blocks and cover eliminated to show the internal torque shaft and pinions;

FIG. 3 is a view taken substantially along line 3-3 of FIG. 2;

FIG. 4C is an enlarged partial front elevational illustration of the slide-out room with the actuating assembly applied, with a portion of the assembly strap and the cover cut away to illustrate detail;

FIG. 8 is a view taken substantially along line 8-8 of FIG. 7;

FIG. 9 is a view in perspective of a rack used in an alternate embodiment of the invention;

DETAILED DESCRIPTION OF INVENTION

Figure 4:
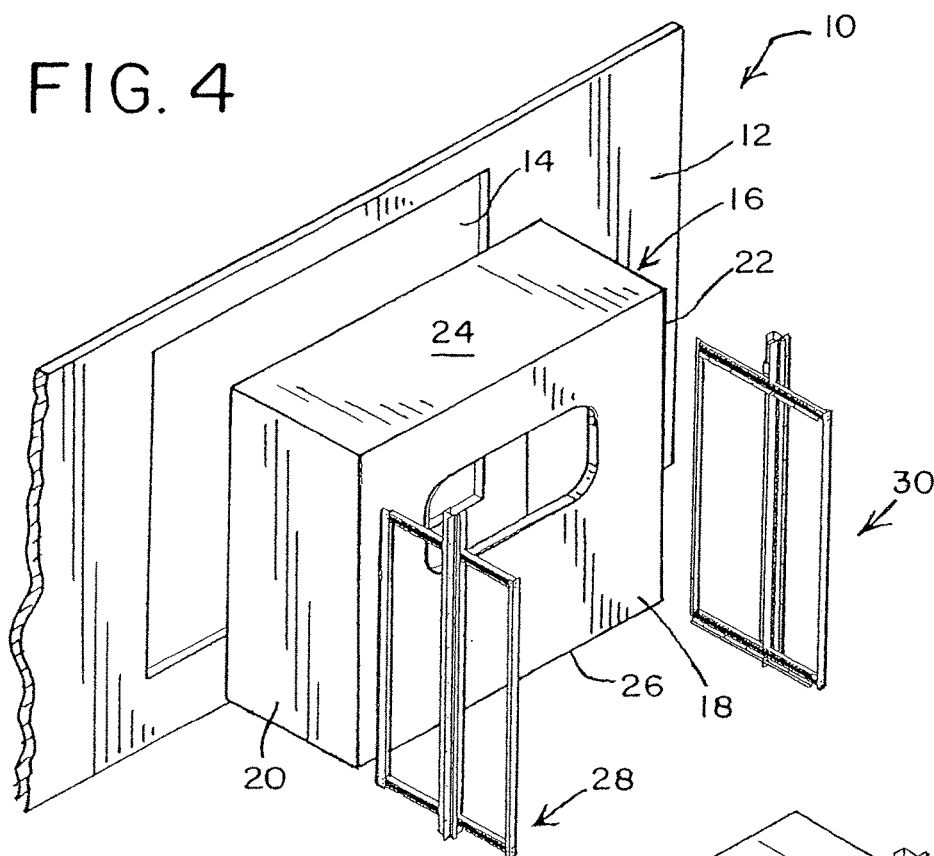
FIG. 4 is an exploded view in perspective of a recreational vehicle including a slide-out room, with actuating assemblies of the present invention shown exploded off of the sides of the slide-out room.
Figure 5:
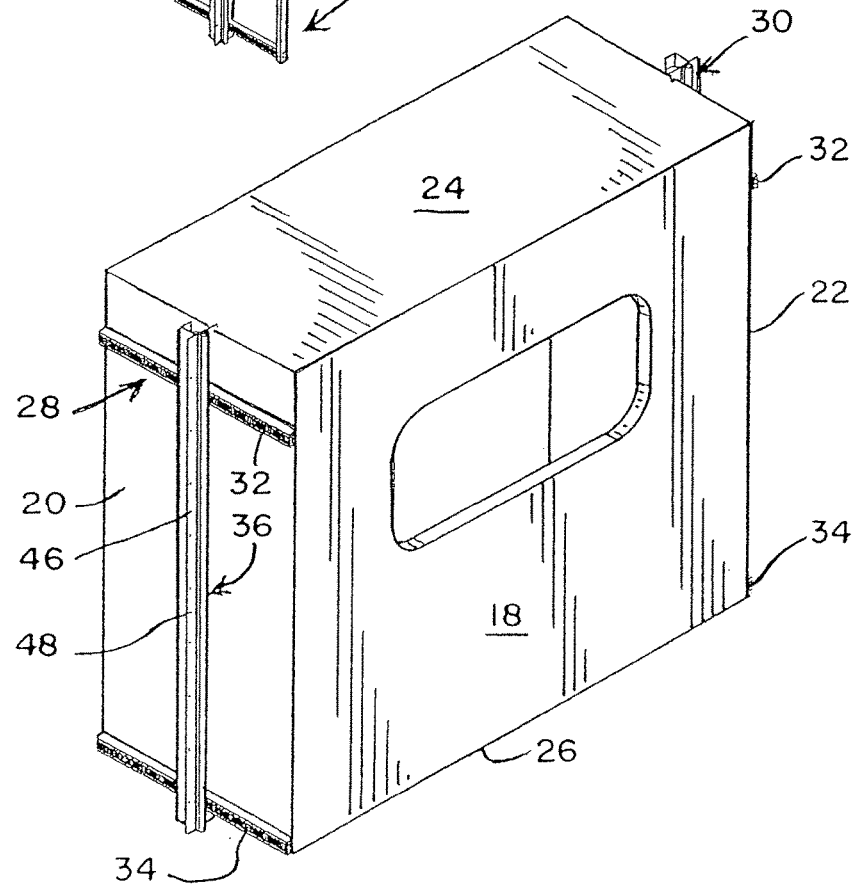
FIG. 5 is a view in perspective of a slide-out room with actuating assemblies made according to the present invention installed thereon.
Figure 4B:
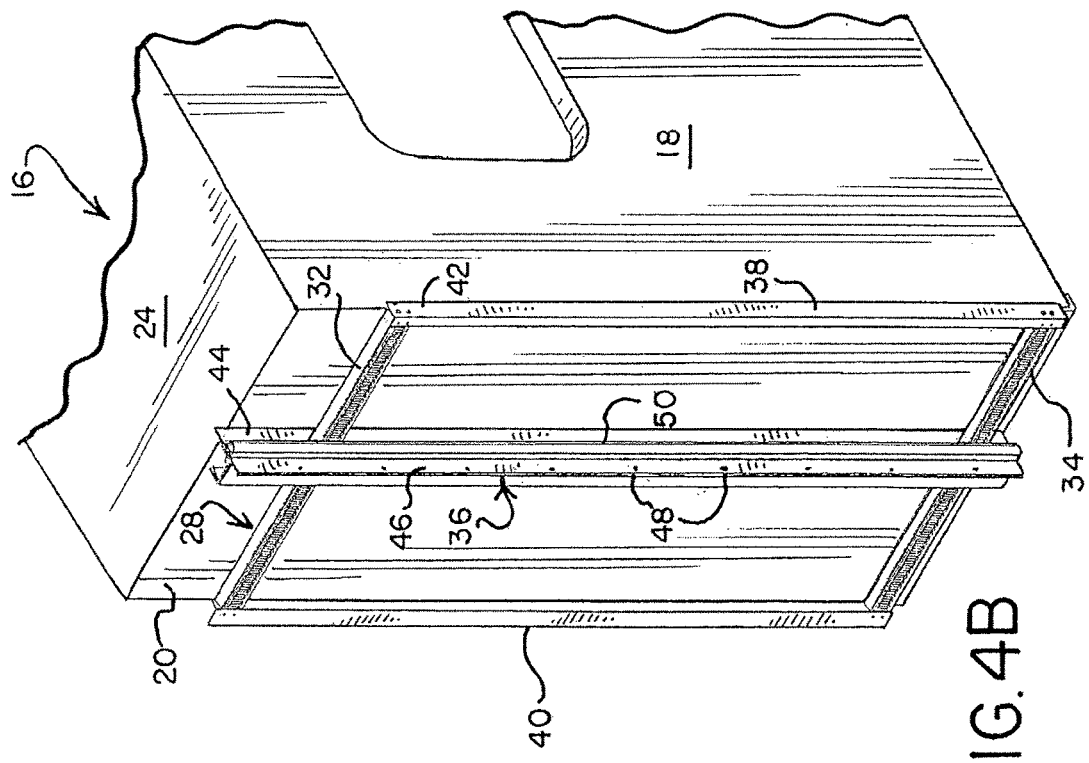
FIG. 4B is a view similar to FIG. 4A, but with the actuating assembly in place, prior to removal of the assembly straps.
Figure 4A:
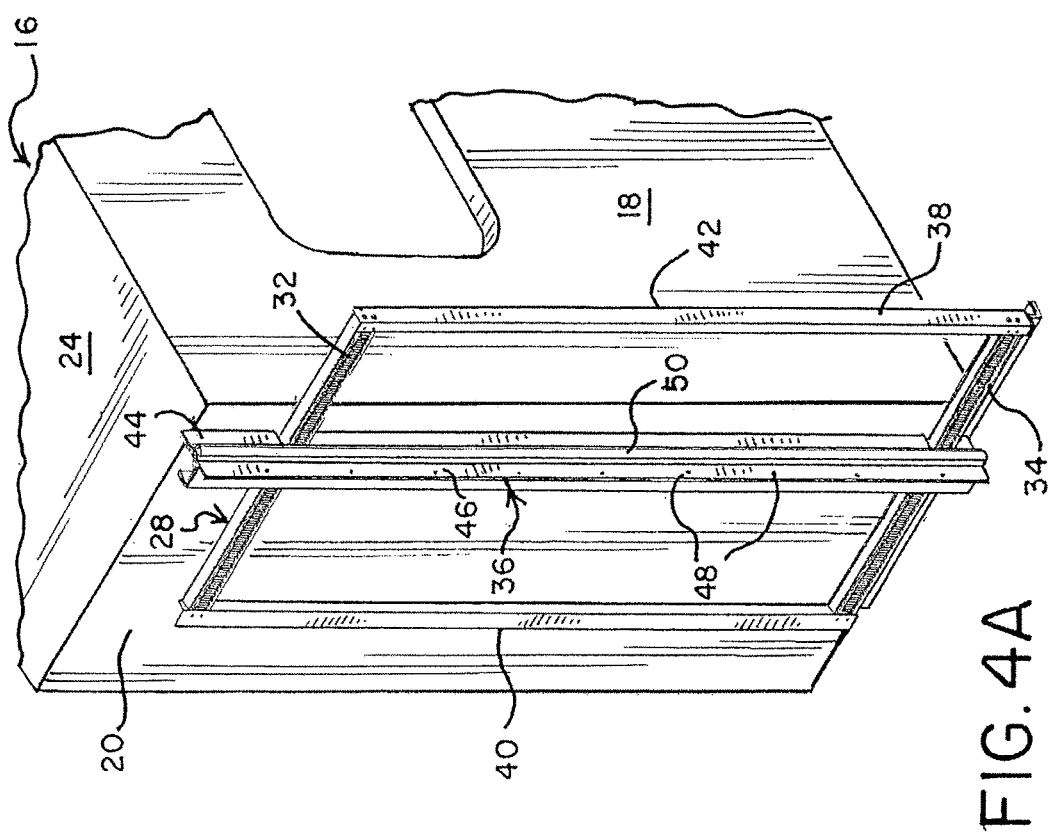
FIG. 4A is a partial perspective view of a slide-out room with the actuating assembly being applied to one side.
Figure 6:
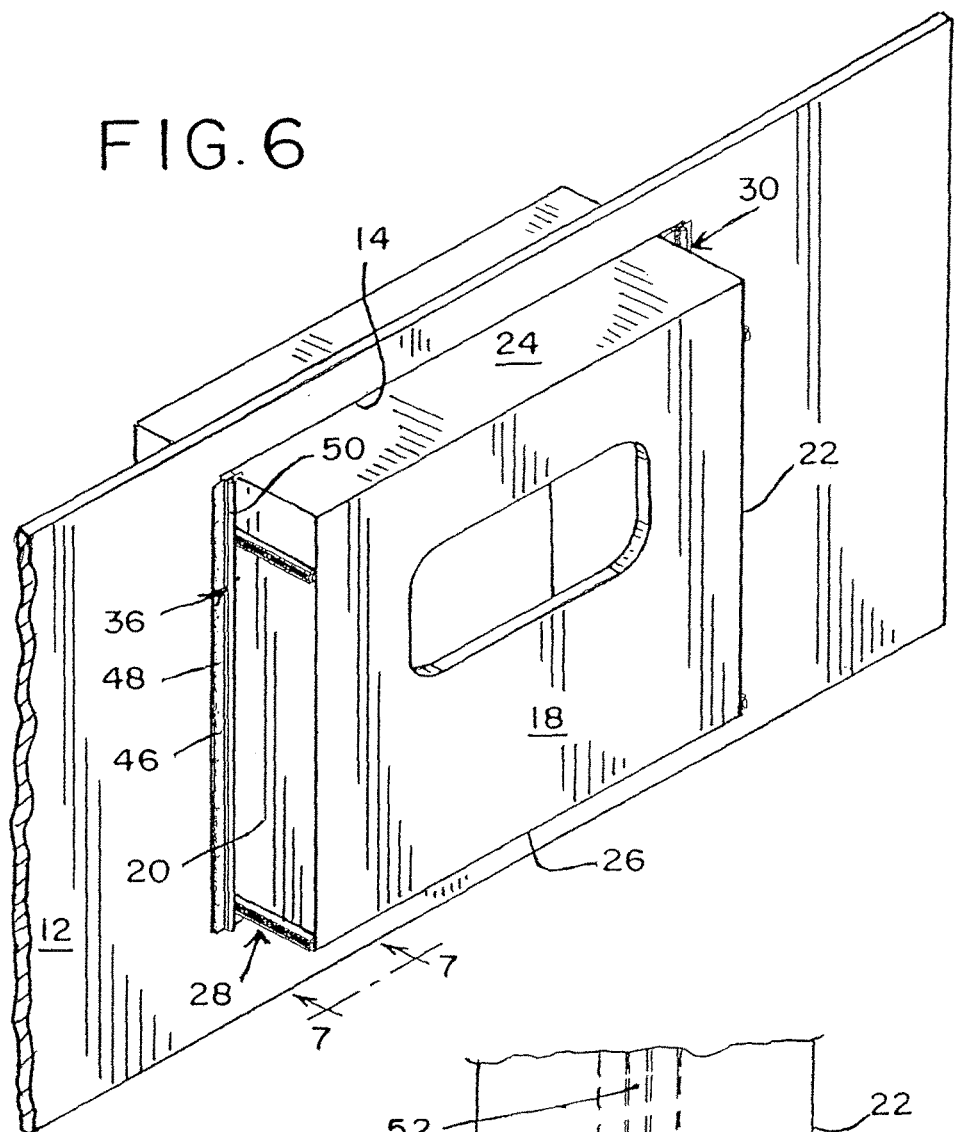
FIG. 6 is a view similar to FIG. 5, but illustrating the manner in which the slide-out room slides into the main living quarters and the manner in which the actuating assemblies are attached to the main living quarters.

Referring now to the drawings, a mobile living quarters, such as a recreational vehicle, is indicated generally at 10, and includes a side wall 12 (the remaining side walls of the vehicle 10 not being shown). Side wall 12 defines an aperture 14 through which a slide-out room generally indicated by the number 16 extends and retracts. Slide-out room 16 includes a front wall 18, two side walls 20, 22 extending from the front wall 18, a ceiling 24 and a floor 26.

Actuation assemblies 28, 30 are mounted on the side walls 20, 22 respectively, the actuation assembly 30 being a mirror image of the actuation assembly 28. As illustrated in FIGS. 1 and 4, each actuation assembly includes an upper rack 32, a lower rack 34, and a cover 36 defining a column which covers the mechanism that drives the rack 32, 34. Although rack and pinion actuators are shown, other equivalent interengaging, relatively movable members, such as welded chains and sprockets, a cog and stamping, timing belt and pulleys and other similar structures may be used; furthermore, although two rack and pinion assemblies are illustrated for each of the assemblies 28, 30, any number of assemblies may be used as necessary or convenient. Assembly straps 38, 40 are illustrated in FIGS. 1 and 4; these assembly straps are temporary to assure that the alignment of the racks 32, 34 remain parallel to each other. Assembly strap 38 includes a projecting flange 42 that projects beyond the racks 32, 34 and is adapted to engage front wall 18 of the slide-out room 16 to thereby locate actuating assembly 28 laterally with respect to the slide-out room 16. As will hereinafter be described, a bearing block covered by the cover of column 36 engages the floor 26 of the slide-out room when the actuating assembly 28 is installed to thereby locate the actuating assembly vertically with respect to the slide-out room 16. Accordingly, the actuating assemblies 28, 30 are fully assembled when they are manufactured and shipped to the assembly plant for attachment to the slide-out room 16 and to the main living quarters. Accordingly, no separate components are required, and assemblies 28, 30 are inherently self-locating. Once the actuating assemblies 28, 30 have been installed, the assembly straps 38, 40 are removed and discarded.

The column or cover 36 includes a generally u-shaped portion 44 that extends around the actuating components for the racks 32, 34, as will hereinafter be described. A flange 46 projects from the u-shaped portion 44 and is provided with apertures 48, which receive fasteners 49 used to attach the actuating assemblies to the side wall 12 adjacent to the aperture 14. In addition to concealing and protecting the actuation components, the column 36 trims up the edges of the aperture 14 and also carries a vertically extending bulb seal 50, which seals the unit when the retractable room is fully retracted into the main living area.

Figure 7:
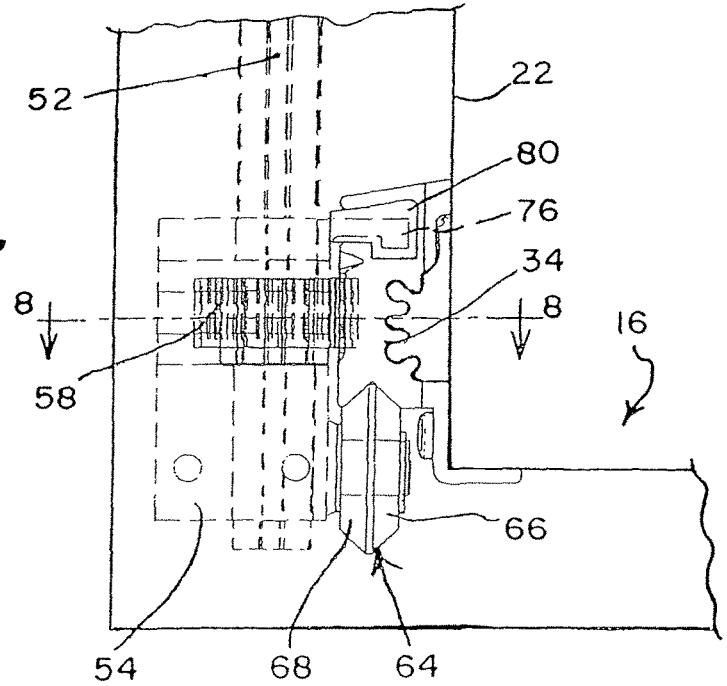
FIG. 7 is a view taken substantially along line 7-7 of FIG. 6.

A splined torque shaft 52 extends substantially vertically in the cover of column 36 and is rotatably supported by a lower bearing block 54 and an upper bearing block (not shown). The upper and lower bearing blocks have been omitted from FIG. 2 for clarity and are substantially identical, so that only lower bearing block 54 will be described in detail. Bearing block 54 has been illustrated in phantom in FIGS. 3 and 7 for clarity. Torque shaft 52 is defined by circumferentially spaced splines 56, which are received in corresponding grooves in pinions 58, 60, which mesh with the gear racks 32, 34, respectively. Upper and lower gear racks 32, 34 are substantially identical, except that the lower gear rack 34 includes a flange 62 which projects therefrom and engages the lower side of the floor 26 of the slide-out room 16 to thereby locate the actuation assembly 28 vertically with respect thereto.

A roller 64, having a substantially v-shaped cross section to define bearing faces 66, 68, is rotatably mounted on a spindle 70 projecting from bearing block 54. Rollers of other complex shapes may be used instead of v-shaped rollers illustrated, it only being necessary that the rollers be shaped to control the relative positions of the rack and the roller, and to permit the slide-out room to move relative to the unit. The racks 32, 34 are each provided with a horizontally extending bearing surface defined by angled bearing faces 72, 74. The bearing faces will, of course, be shaped complementary to the cross section of the roller. A hooked extension extends from the bearing block 54 into a longitudinally extending groove 78 (FIG. 2) of the rack 34. Hooked extension 76 is covered by a low friction, plastic (Delrin) shoe 80 which rides in the groove 78 as the slide-out room extends and retracts. The shoe 80 and groove 78 maintain engagement of the roller 64 with the rack 34 and maintain engagement of the rack with the pinion. As described above, a bulb seal 50 extends along u-shaped portion 44 of the column 36. As can be seen in FIG. 8, when the slide-out room 16 is in the fully retracted position, an extension 84 carried by the slide-out room 16 engages bulb seal 50, compressing the latter, to assure a weather-tight seal protecting the pinions, torque shafts, and motor from the environment.

Figure 10:
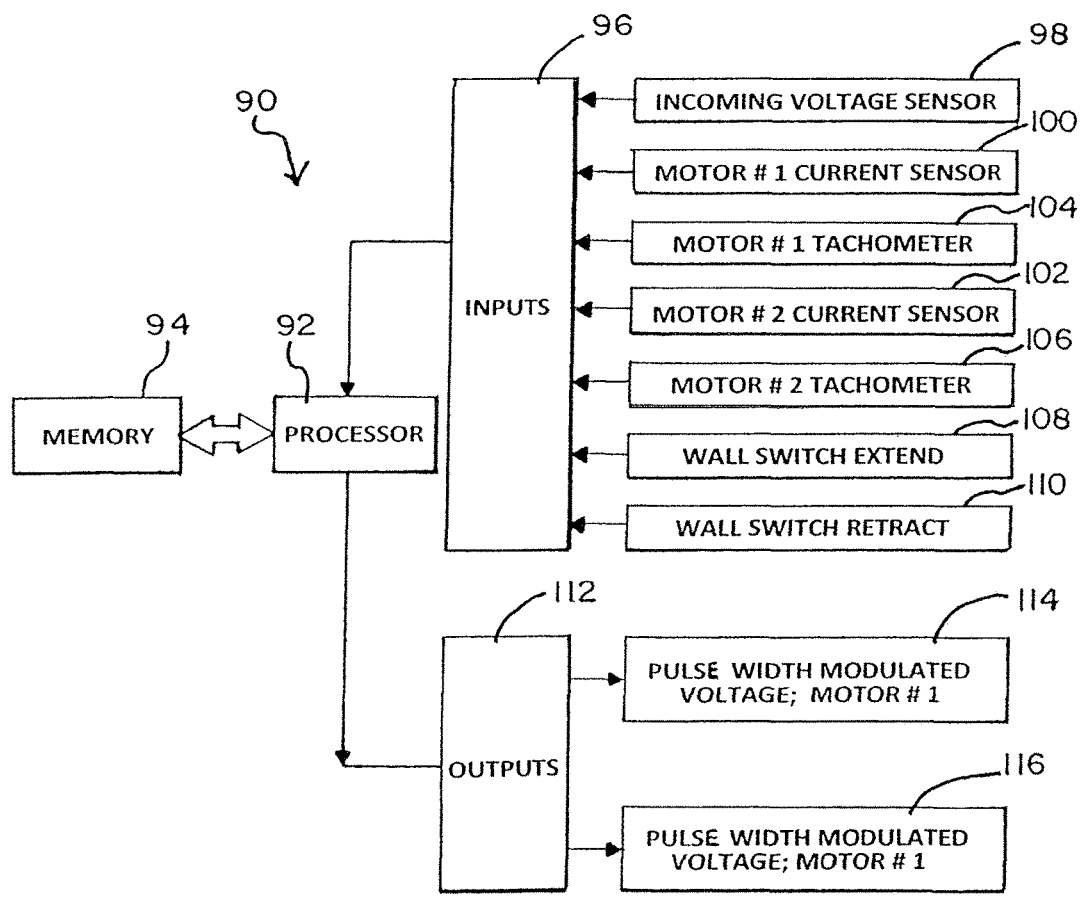
FIG. 10 is a schematic illustration of the control system used to control system used to control the actuating assemblies used in the present invention.
Figure 11:
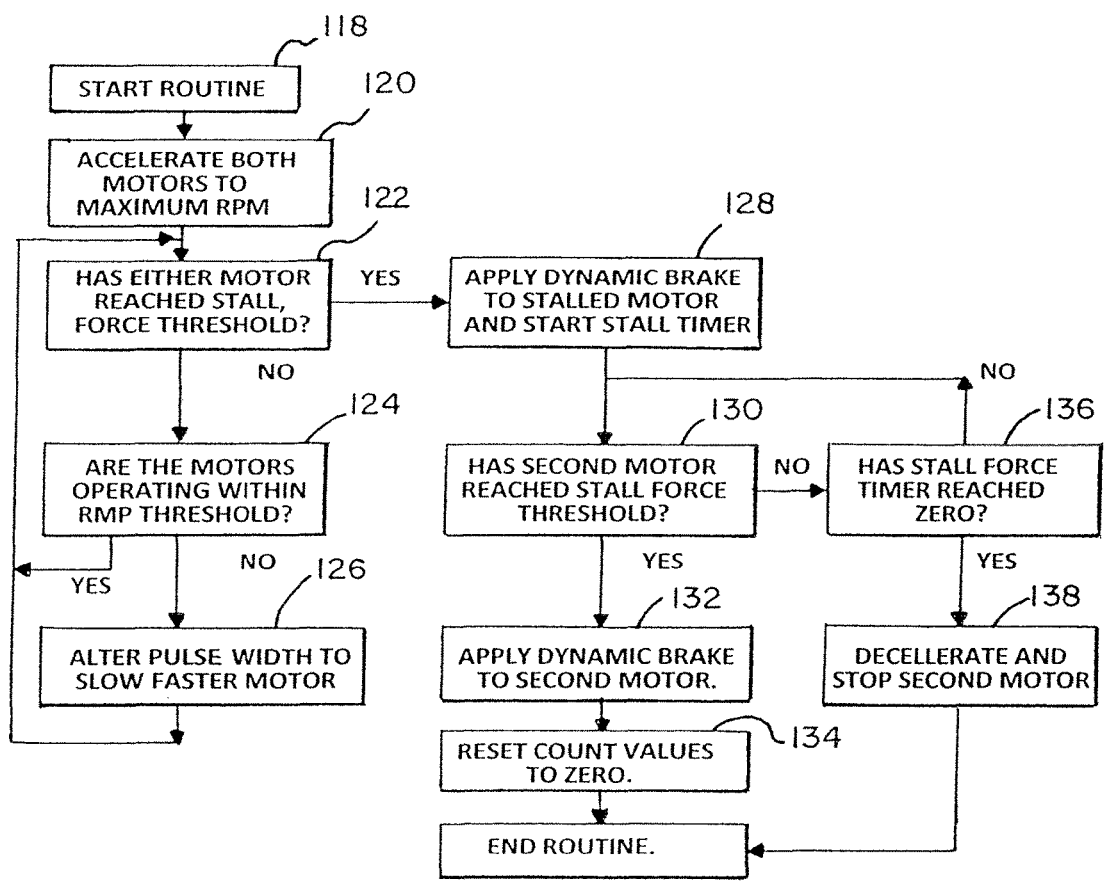
FIG. 11 is a detailed schematic of the control logic used in the control system illustrated in FIG. 10.

An electric motor 82 is supported on the upper most end of the torque shaft 52 for rotating the latter. The motor 82 is a bi-directional motor, and rotates the shaft in one direction to extend the slide-out room from the main living quarters, and in the opposite direction to retract the slide-out into the main living quarters. The actuation assembly 30 on the opposite side wall 22 is a mirror image of the actuation assembly 28. Another motor identical to the motor 83 operates actuation assembly 30. Both motors are driven by a synchronizing drive control 90, as illustrated in FIG. 10 and FIG. 11, so that both the actuating assemblies extend and retract at substantially the same rate, as will hereinafter be described. Alternatively, a transverse shaft extending over the slide-out room and connected to both torque shafts 52 by a gear drive may be used with only one motor.

Referring now to FIG. 10, synchronizing drive control 90 includes a processor 92, which transmits data to, and receives data from, a memory 94. Input bus 96 for processor 92 receives a voltage input from voltage sensor 98, current sensor inputs 100 and 102, which input signals measuring current draw of the corresponding motor, and tachometers or speed sensor inputs 104, 106, which are connected to speed sensors for each of the motors and which generate pulse trains that are proportional to the rotational speed of the motors. Other inputs include 108 and 110, which transmit a signal from a wall switch within the unit which is operated when the user desires to extend or retract the slide-out room. The effect of the inputs 108 and 110 is to reverse the direction of rotation of the motors, but operation of the system 90 is otherwise the same if the slide-out room is either extended or retracted. Processor 92 includes a pulse width modulator which generates pulse width modulated voltage signals which are transmitted to the motors through output bus 112, as indicated at 114 and 116.

Referring now to FIG. 11, when the user operates the wall switch to either extend or retract the slide-out room, processor 92 responds by starting the control routine, as indicated at 118. Both motors are accelerated to their maximum speed, as indicated at 120, it being noted that the maximum speed of the motors may be different (due, for example, to differences in weight carried on different sides of the slide-out room). A test is made, as indicated at 122, to determine if either motor has reached the stall threshold. This is done by comparing the current draw of each motor, as sensed by sensor inputs 100 and 102. The current draw of the motors increases substantially when the motor stalls out at the end of the stroke of the slide-out room (such as when it attains the fully extended or fully retracted position, or when the slide-out room encounters an obstruction requiring greatly increased power). If both motors are operating below the stall threshold, a check is made to determine if the motors are operating within a predetermined speed range of one another, as indicated at 124. If the motors are operating outside of the speed range, the pulse width of the voltage signal to the faster motor is altered to slow the faster motor to within the speed range, as indicated at 126.

If the test at 122 indicates that one of the motors has reached the stall threshold, the stalled motor is dynamically braked, as indicated at 128 (by switching terminals of the motor together), and a stall timer is started. As indicated at 130, the current draw of the other motor is then tested to determine its stall threshold has been reached. If the stall threshold of the second motor has been reached, the second motor is braked (as indicated at 132), the values of the counts from the motor speed sensors stored in memory are reset to zero (as indicated at 134), and the routine is ended. If the test made at 130 indicates the second motor has not yet stalled out, a test is made at 136 to determine if the stall timer has timed out. If the stall timer has timed out, the other motor is stopped (as indicated at 138), whereupon the routine is ended. By continuing to operate the motor not reaching the stall threshold after the first motor reaching the stall threshold has been stopped, both sides of the slide-out room are independently brought into engagement with their corresponding bulb seals 50, thus assuring sealing completely around the slide-out room. The stall force timer assures that one motor will not be operated longer than a predetermined time period after the other motor has stalled, so that if the stalling is caused by one side of the slide-out room striking an obstruction, the motor actuating the other side will not operate indefinitely, or if the clearances across the slide-out room are sufficiently different that both sides of the slide-out room cannot be sealed, the system will not be operated indefinitely.

In operation, when the user desires to extend the slide-out room 16, the motors 82 are caused to turn in a direction turning the pinions 58, 60 to cause the racks, due to their engagement therewith, to be driven outwardly with respect to the main living quarters, thereby carrying the slide-out room with the rack. Rollers 64, due to their engagement with the rack 34, carry the weight of the slide-out room and maintain the floor 26 of the slide-out room raised above the floor of the main living quarters. Accordingly, damage to the floor of the main living quarters, common in the prior arts when slide-out rooms are extended or retracted, is avoided. Since, as described above, actuating assemblies 28, 30 are shipped as a unit to the manufacturing plant, assembly and adjustment of separate components is not necessary. The slide-out room 16 is retracted into the main living quarters by causing the motor 82 to turn in the reverse direction, thereby moving the racks 32, 34 into the main living quarters, carrying the slide-out room 16 with them.

As discussed above, prior art slide-out rooms require multiple adjustments to center the slide-out room in the opening in the unit in order to provide a weather-tight seal when the room is extended and retracted, and require periodic adjustments to re-center the slide-out room to compensate for normal road vibrations. In the present invention, the actuating assemblies 28, 30 are located vertically on their corresponding side walls 20, 22 by engagement of the flange 62 with the floor 26, and are located horizontally on their corresponding side walls 20, 22 by the flange 42 of the assembly straps 38, 40. The clearance between the slide-out room and the side of the aperture 14 is set by attachment of flange 62 to the side wall 12. Since the bulb seal 50 is attached to the column 36 when the actuating assemblies 28, 30 are manufactured and proper positioning of the actuating assemblies 28, 30 on their corresponding side walls is assured, no adjustment of the slide-out room after installation on the unit is required or possible.

Slide-out rooms tend to tip downward relative to the unit when extended, and this tipping must be resisted, requiring heavier and more powerful actuators than would otherwise be necessary. In the present invention, tipping forces are transmitted through upper rack 32 and pinion 60 to apply a twisting force to the torque shaft 52, which is resisted by the torsional stiffness of the torque shaft 52. The twisting forces are transmitted through the torque shaft 52 to the lower pinion 58 and the lower rack 34, to thereby apply a countervailing force to the lower portion of the slide-out room, thereby tending to right the slide-out room. Accordingly, the power required of the motor 82 remains relatively small compared to prior art actuating mechanisms.

Referring now to FIG. 9, a modified rack 86 is provided with an upwardly inclining portion 88. The operation of the unit equipped with the inclined rack 86 is the same as in the preferred embodiment, except that when the pinion travels along the inclined section 88 the slide-out room is allowed to drop gradually, thereby bringing the floor of the slide-out room into registry with the floor of the main living quarters. The pinions are allowed axial movement along the torque shaft, thereby permitting the pinions to remain in driving engagement with the rack teeth after the inclined section 88 is reached. Instead of the hooked extension 76 and shoe 80, the unit using the inclined rack 86 is provided with a secondary roller having a v-shaped cross section (not shown). This secondary roller is much smaller than the roller 64, and engages bearing surfaces 89 in the groove 91, which extends longitudinally just above the tooth portion of the rack. The function of the secondary roller is the same as the hooked extension 76 and shoe 80.

This invention is not limited to the details above, but may be modified within the scope of the following claims.

What is claimed is:

1. An actuating assembly for extending and retracting through an aperture in a side wall of a mobile living quarters a slide out room having first and second opposing side walls and a floor, the actuating assembly comprising:
    an upper gear rack comprising teeth, the upper gear rack configured for mounting on an upper portion of the first side wall of the slide out room such that the teeth face outwardly from the first side wall of the slide out room, the upper gear rack further comprising a longitudinally extending groove;
    a lower gear rack comprising teeth, the lower gear rack configured for mounting on a lower portion of the first side wall of the slide out room such that the teeth face outwardly from the first side wall of the slide out room, the lower gear rack further comprising a longitudinally extending groove;
    a drive mechanism configured for mounting to the side wall of the mobile living quarters adjacent to the aperture in the side wall of the mobile living quarters and adjacent the first side wall of the slide out room, the drive mechanism comprising:
    a column configured for attachment to the side wall of the mobile living quarters;
    an upper bearing block disposed in an upper portion of the column;
    a first hooked extension extending from the upper bearing block into the longitudinally extending groove of the upper gear rack;
    a lower bearing block disposed in a lower portion of the column;
    a second hooked extension extending from the lower bearing block into the longitudinally extending groove of the lower gear rack;
    a torque shaft having a longitudinal axis, the torque shaft rotatably supported by the upper bearing block and the lower bearing block;
    an upper pinion gear engaged with the torque shaft and the upper gear rack;
    a lower pinion gear engaged with the torque shaft and the lower gear rack; and
    an electric motor configured to rotate the torque shaft, the motor disposed in the column;
    wherein the torque shaft, the upper pinion gear, and the lower pinion gear are allowed to float on an axis perpendicular to the torque shaft axis.

2. The actuating assembly of claim 1 further comprising:
    a first assembly strap connected to a first end of the upper gear rack and a first end of the lower gear rack; and
    a second assembly strap connected to a second end of the upper gear rack and a second end of the lower gear rack;
    wherein the upper gear rack is parallel to the lower gear rack.

3. The actuating assembly of claim 2 wherein one of the first assembly strap and the second assembly strap includes a projecting flange configured to locate the actuating assembly laterally with respect to the slide out room.

4. The actuating assembly of claim 1, the lower gear rack further comprising a flange projecting therefrom for engagement with a lower side of the floor of the slide out room.

5. The actuating assembly of claim 1, wherein the column comprises a flange configured to trim up edges of the aperture in the side wall of the mobile living quarters.

6. The actuating assembly of claim 1, wherein at least one of the upper bearing block and the lower bearing block rests on keys restricting movement of the at least one of the upper bearing block and the lower bearing block parallel to the torque shaft axis and allowing movement of the at least one of the upper bearing block and the lower bearing block perpendicular to the torque shaft axis.

7. An actuating assembly for extending and retracting through an aperture in a side wall of a mobile living quarters a slide out room having first and second opposing side walls and a floor, the actuating assembly comprising:
    an upper gear rack comprising teeth, the upper gear rack configured for mounting on an upper portion of the first side wall of the slide out room such that the teeth face outwardly from the first side wall of the slide out room, the upper gear rack further comprising a longitudinally extending groove;
    a lower gear rack comprising teeth, the lower gear rack configured for mounting on a lower portion of the first side wall of the slide out room such that the teeth face outwardly from the first side wall of the slide out room, the lower gear rack further comprising a longitudinally extending groove;
    a drive mechanism configured for mounting to the side wall of the mobile living quarters adjacent to the aperture in the side wall of the mobile living quarters and adjacent the first side wall of the slide out room, the drive mechanism comprising:
    a column configured for attachment to the side wall of the mobile living quarters;
    an upper bearing block disposed in an upper portion of the column;
    a first hooked extension extending from the upper bearing block into the longitudinally extending groove of the upper gear rack;
    a lower bearing block disposed in a lower portion of the column;
    a second hooked extension extending from the lower bearing block into the longitudinally extending groove of the lower gear rack;
    a torque shaft having a longitudinal axis, the torque shaft rotatably supported by the upper bearing block and the lower bearing block;
    an upper pinion gear engaged with the upper gear rack;
    a lower pinion gear engaged with the torque shaft and the lower gear rack; and
    a motor engaged with the upper pinion gear, the motor disposed in the column;

wherein the torque shaft, the upper pinion gear, and the lower pinion gear are allowed to float on an axis perpendicular to the torque shaft axis.

8. The actuating assembly of claim 7 wherein rotation of the motor results in rotation of the upper pinion gear and the lower pinion gear.

9. The actuating assembly of claim 7 further comprising:
a first assembly strap connected to a first end of the upper gear rack and a first end of the lower gear rack; and
a second assembly strap connected to a second end of the upper gear rack and a second end of the lower gear rack;
wherein the upper gear rack is parallel to the lower gear rack.

10. The actuating assembly of claim 7 wherein one of the first assembly strap and the second assembly strap includes a projecting flange configured to locate the actuating assembly laterally with respect to the slide out room.

11. The actuating assembly of claim 7, the lower gear rack further comprising a flange projecting therefrom for engagement with a lower side of the floor of the slide out room.

12. The actuating assembly of claim 7, wherein the column comprises a flange configured to trim up edges of the aperture in the side wall of the mobile living quarters.

13. The actuating assembly of claim 7, wherein at least one of the upper bearing block and the lower bearing block rests on keys restricting movement of the at least one of the upper bearing block and the lower bearing block parallel to the torque shaft axis and allowing movement of the at least one of the upper bearing block and the lower bearing block perpendicular to the torque shaft axis.

14. An actuating assembly for extending and retracting through an aperture in a side wall of a mobile living quarters a slide out room having first and second opposing side walls and a floor, the actuating assembly comprising:
an upper gear rack comprising teeth, the upper gear rack configured for mounting on an upper portion of the first side wall of the slide out room such that the teeth face outwardly from the first side wall of the slide out room, the upper gear rack further comprising a longitudinally extending groove;
a lower gear rack comprising teeth, the lower gear rack configured for mounting on a lower portion of the first side wall of the slide out room such that the teeth face outwardly from the first side wall of the slide out room, the lower gear rack further comprising a longitudinally extending groove;
a drive mechanism configured for mounting to the side wall of the mobile living quarters adjacent to the aperture in the side wall of the mobile living quarters and adjacent the first side wall of the slide out room, the drive mechanism comprising:
a column configured for attachment to the side wall of the mobile living quarters;
an upper bearing block disposed in an upper portion of the column;
a first hooked extension extending from the upper bearing block, the first hooked extension configured for engagement with the longitudinally extending groove of the upper gear rack;
a lower bearing block disposed in a lower portion of the column;
a second hooked extension extending from the lower bearing block, the second hooked extension configured for engagement with the longitudinally extending groove of the lower gear rack;
a torque shaft having a longitudinal axis, the torque shaft rotatably supported by the upper bearing block and the lower bearing block;
an upper pinion gear engaged with the torque shaft and the upper gear rack; and
a lower pinion gear engaged with the torque shaft and the lower gear rack;
wherein rotation of the upper and lower pinion gears drives the upper and lower gear racks, and
wherein the torque shaft, the upper pinion gear, and the lower pinion gear are allowed to float on an axis perpendicular to the torque shaft axis.

15. The actuating assembly of claim 14 further comprising:
a first assembly strap connected to a first end of the upper gear rack and a first end of the lower gear rack; and
a second assembly strap connected to a second end of the upper gear rack and a second end of the lower gear rack;
wherein the upper gear rack is parallel to the lower gear rack.

16. The actuating assembly of claim 14 wherein one of the first assembly strap and the second assembly strap is configured to locate the actuating assembly laterally with respect to the slide out room.

17. The actuating assembly of claim 14 wherein one of the first assembly strap and the second assembly strap includes a projecting flange configured to locate the actuating assembly laterally with respect to the slide out room.

18. The actuating assembly of claim 14, the lower gear rack further comprising a flange projecting therefrom for engagement with a lower side of the floor of the slide out room.

19. The actuating assembly of claim 14, wherein the column comprises a flange configured to trim up edges of the aperture in the side wall of the mobile living quarters.

20. The actuating assembly of claim 14, wherein at least one of the upper bearing block and the lower bearing block rests on keys restricting movement of the at least one of the upper bearing block and the lower bearing block parallel to the torque shaft axis and allowing movement of the at least one of the upper bearing block and the lower bearing block perpendicular to the torque shaft axis.

21. The actuating assembly of claim 14 further comprising a motor configured to drive said upper and lower pinion gears, the motor disposed in the column.

* * * * *